United States Patent

Morozowich

[11] 3,853,843
[45] Dec. 10, 1974

[54] DERIVATIVES OF THIOLINCOSAMINIDE COMPOUNDS

[75] Inventor: Walter Morozowich, Kalamazoo, Mich.

[73] Assignee: The Upjohn Company, Kalamazoo, Mich.

[22] Filed: Feb. 22, 1973

[21] Appl. No.: 334,723

Related U.S. Application Data

[63] Continuation-in-part of Ser. No. 314,729, Dec. 13, 1972, abandoned.

[52] U.S. Cl. .............................. 260/210 R, 424/180
[51] Int. Cl. ............................................. C07c 47/18
[58] Field of Search ................................ 260/210 R

[56] References Cited
UNITED STATES PATENTS 3,689,474  9/1972  Kagan et al. ..................... 260/210 R
3,702,322  11/1972  Bannister ......................... 260/210 R Primary Examiner—Johnnie R. Brown
Attorney, Agent, or Firm—Joseph T. Eisele; Roman Saliwanchik

[57] ABSTRACT

Antibacterial compounds of the formula:

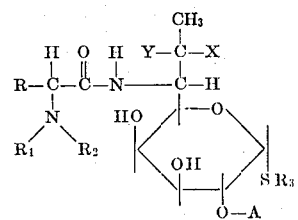

and the acid addition salts thereof are disclosed, wherein R, $R_1$ and $R_2$ are each selected from hydrogen and alkyl of 1 to 20 carbon atoms, provided the total number of carbon atoms in R, $R_1$ and $R_2$ together does not exceed 20; $R_3$ is alkyl of 1 to 2 carbon atoms; X is hydrogen or hydroxy; Y is hydrogen when X is hydroxyl and when X is hydrogen Y is hydrogen, chlorine, bromine, iodine, alkylthio or hydroxy-substituted alkylthio having 1 to 18 carbon atoms; A is hydrogen or an acyl radical or a hydrocarbon carboxylic acid. The compounds show antibacterial activity against a broad range of both Gram-negative and Gram-positive microorganisms. Disclosed also are methods of preparing and using the novel compounds.

20 Claims, No Drawings

1

DERIVATIVES OF THIOLINCOSAMINIDE COMPOUNDS

CROSS-REFERENCE TO RELATED APPLICATION

This application is a continuation-in-part of copending U.S. Pat. application Ser. No. 314,729, filed Dec. 13, 1972, now abandoned.

BACKGROUND OF THE INVENTION

1. Field of the Invention

This invention relates to novel antibacterial compounds, methods of preparing them and methods of using them. More particularly, this invention concerns novel alpha amino acid amide derivatives of methyl thiolincosaminides and the related methyl 7(S)-chloro-7-deoxythiolincosaminides.

2. Description of the Prior Art

Lincomycins and 7-halo-7-deoxylincomycins have been described previously; see for example U.S. Pat. Nos. 3,380,992; 3,395,139; 3,426,012; 3,496,163; 3,580,904.

SUMMARY OF THE INVENTION

The invention comprises compounds selected from the group consisting of those of formula:

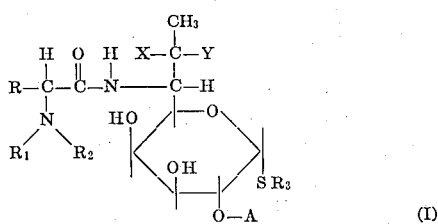

wherein R, $R_1$ and $R_2$ are each selected from hydrogen, and alkyl of from 1 to 20 carbon atoms, inclusive, provided that the total number of carbon atoms in R, $R_1$ and $R_2$ together does not exceed 20; $R_3$ is alkyl of 1 to 2 carbon atoms, inclusive; X is selected from hydrogen and hydroxy; Y is hydrogen when X is hydroxy and when X is hydrogen Y is selected from hydrogen, chlorine, bromine, iodine, alkylthio and monohydroxy-substituted alkylthio, said alkylthio in each instance having from 1 to 18 carbon atoms, inclusive; A is selected from hydrogen and an acyl radical of a hydrocarbon carboxylic acid containing from 2 to 18 carbon atoms, inclusive; and the acid addition salts thereof.

The invention also comprises methods of preparing and using the compounds of the invention.

The term "alkyl" is used throughout the specification and claims in its usually accepted sense, and is illustrated by alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl and isomeric forms thereof.

The term "alkylthio" means the monovalent moiety of formula:
    alkyl—S—
and is illustrated by groups such as methylthio, ethylthio, propylthio, butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio and isomeric forms thereof.

The term "acyl radical of a hydrocarbon carboxylic acid" means the monovalent moiety of formula:

wherein B is hydrocarbyl or hydrocarbyl substituted with a halo, nitro, hydroxy, amino, cyano, thiocyano, or alkoxy group. Illustrative of acyl radicals of a hydrocarbon carboxylic acid wherein B is hydrocarbyl are the acyl radicals of (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic, acids and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethlcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclohexanebutyric acid, methylcyclohexaneacetic acid, and the like; (d) aromatic carboxylic acids, for example, benzoic acid, toluic acid, naphthoic acid, ethylbensoic acid, isobutylbenzoic acid, methylbutylbenzoic acid, and the like; and (e) aromaticaliphatic carboxylic acids, for example, phenylacetic acid, phenylpropionic acid, phenylvaleric acid, cinnamic acid, phenylpropiolic acid, and naphthylacetic acid, and the like. Illustrative of acyl radicals of a hydrocarbon carboxylic acid wherein B is halo, nitro, hydroxy, amino cyano, thiocyano or alkoxy substituted hydrocarbyl are the acyl radicals of the above carboxylic acids which are substituted by one or more halogen, nitro, hydroxy, amino, cyano, thiocyano, or alkoxy groups such as for example, mono-, di-, and trichloroacetic acids; α- and β- chloropropionic acid; α- and γ-bromobutyric acid; α- and iodovaleric acid; mevalonic acid; 2- and 4-chlorocyclohexanecarboxylic acid; shikimic acid; 2-nitro-1-methylcyclobutanecarboxylic acid; 1,2,3,4,5,6-hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxlic acid; 2,3-dibromo-2-methylcyclohexanecarboxylic acid; 2,5-dibromo-2-methylcyclohexanecarboxylic acid; 4,5-dibromo-2-methylcyclohexanecarboxlic acid; 5,6-dibromo-2-methylcyclohexanecarboxylic acid; 3-bromo-3 -methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo4-methylcyclohexanecarboxylic acid; 3-bromo-2,2,3-trimethylcyclopentanecarboxylic acid; 1-bromo-3,5-dimethylcyclohexanecarboxylic acid; homogentisic acid; o-, m-, and p-chlorobenzoic acid, anisic acid; salicylic acid; p-hydroxybenzoic acid; β-resorcyclic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid;

2,4,6-trinitrobenzoic acid; thiocyanoacetic acid; cyanopropionic acid; lactic acid; ethoxyformic acid (ethyl hydrogen carbonate); butyloxyformic acid; pentyloxyformic acid, hexyloxyformic acid, dodecyloxyformic acid; hexadecyloxyformic acid, and the like.

The compounds (I) of the invention possess antibacterial activity and are useful in inhibiting a broad range of both Gram-positive and Gram-negative microorganisms. For example, the compounds (I) of the invention inhibit growth of microorganisms such as B. *subtilis*, S. *aureus*, S. *lutea*, M. *avium*, K. *pneumoniae*, and E. *coli*. This property makes the compounds (I) useful for decontaminating food utensils, surgical instruments, medical laboratory equipment and like uses.

The compounds (I) are also effective antibacterials against *Pseudomonas fluorescens* and are therefore particularly useful in disinfecting machinery used for processing and packaging meat, fish and fowl.

Preferred for their antibacterial activity are those compounds of formula (I) wherein at least one of R, $R_1$ and $R_2$ is alkyl and the total number of carbon atoms in R, $R_1$ and $R_2$ taken together is from about 6 to about 16.

Compounds (I) of the invention wherein Y is alkythio or monohydroxy-substituted alkylthio are also preferred for their high degree of antibacterial activity.

DETAILED DESCRIPTION OF THE INVENTION

Compounds of formula (I) wherein A represents an acyl radical as previously described are particularly useful for the preparation of aqueous solutions since they generally show good solubility or provide fine suspensions in water.

The acylates of formula (I) are readily prepared from the corresponding compounds (I) wherein A represents hydrogen. In general, the method comprises first attaching protective groups at hydroxyl group sites located on carbon atoms at positions 3, 4 and 7. Thus, for example, the compound (I) wherein A is hydrogen is condensed with an aromatic aldehyde such as benzaldehyde to obtain the corresponding 3,4-0-arylidenecompound. For those compounds of formula (I) wherein X is hydroxyl, the 3,4-0-arylidenecompound is then tritylated with a trityl halide such as trityl chloride to obtain the corresponding 7-0-trityl-3,4-0-arylidenethiolincosaminide. The intermediate 3,-4-0-arylidenethiolincosaminides and 7-0-trityl-3,4-0-arylidene-thiolincosaminides are acylated with an appropriate acyl halide or anhydride of a hydrocarbon carboxylic acid corresponding to the desired acyl radical A of formula (I). The 2-acylate so obtained is then hydrolyzed by conventional methods to remove the aforementioned protective groups, yielding compounds of the formula (I), wherein A is an acyl radical as defined above.

Acyl halides and anhydrides of hydrocarbon carboxylic acids having from 2 to 18 carbon atoms, inclusive, and which are employed in the above described acylation are generally well known. Representative of such acyl halides are acetyl chloride, propionyl chloride, triethylacetyl bromide, triethylbutyryl fluoride, 3,3-dimethylbutyryl bromide, tripropylpropionyl bromide, palmityl chloride, stearoyl bromide and the like.

Representative of acyl anhydrides of hydrocarbon carboxylic acids are the anhydrides of acetic, butyric, hexanoic, decanoic, palmitic acids and isomers thereof; acrylic, hexynoic and like acids; cyclopentanecarboxylic; dicyclohexanecarboxylic and like acids; benzoic, toluic, naphthoic and like acids; phenylacetic, cinnamic, naphthylacetic and like acids.

Complete details of the acylation method described above are found in U.S. Pat. No. 3,426,012, particularly at Col. 2, line 33 through Col. 8, line 45. One skilled in the art will recognize that compounds of the formula (I) wherein A represents an acyl radical of a hydrocarbon carboxylic acid are readily prepared by replacing the lincomycin starting compounds used in the process of U.S. Pat. No. 3,426,012 with compounds of the formula (I) wherein A is hydrogen.

Compounds of the invention having the formula (I) wherein A is hydrogen are prepared by a variety of methods depending upon the meaning assigned to $R_1$ and $R_2$ in the formula (I). The methods are broadly outlined according to the scheme:

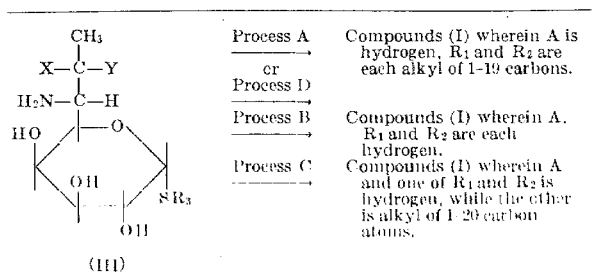

wherein X, y and $R_3$ are as before defined.

Process A

Those compounds (I) wherein A is hydrogen, $R_1$ and $R_2$ are each specifically alkyl of 1 to 19 carbon atoms, inclusive, i.e., a compound of the formula (IV) below, are prepared by reacting a mixed anhydride of formula (II) with a thiolincosaminide of formula (III). The reaction is illustrated by the schematic formula:

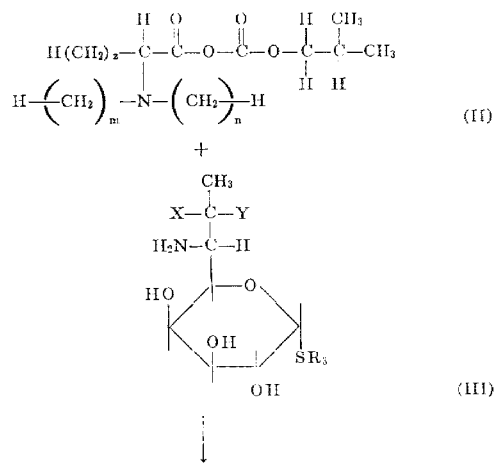

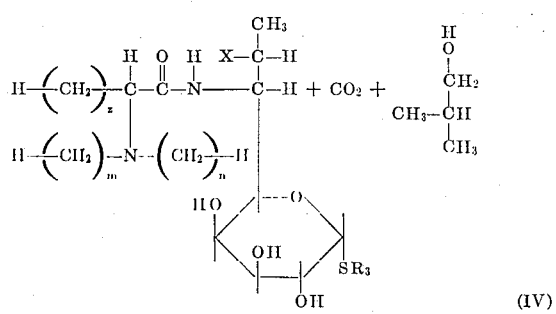

(IV)

wherein $R_3$, Y and X are as previously defined; m and n are each integers of 1 to 19; Z is an integer of 0 to 18 and the sum of m+n+z is from 2 to 20.

The process of preparing compounds (IV) of the invention is carried out by admixing substantially equimolar proportions of the reactants (II) and (III) in an inert solvent and in the presence of a tertiary amine.

The term "inert solvent" as used herein means a solvent for reactants (II) and (III) which does not enter into or adversely effect the desired course of the reaction. Examples of inert solvents are inert organic solvents such as the alkanols methanol, ethanol, propanol, butanol, heptanol, hexanol, and the like; ketones such as acetone, cyclohexanone, methylethylketone and the like; acetates such as methyl acetate, ethyl acetate, butyl acetate and the like; aromatic organic solvents such as benzene, toluene, xylene and the like; tetrahydrofuran, acetonitrile, dimethylformamide and the like. Preferred as the inert solvent are mixtures of water with water miscible organic solvents such as acetone, acetonitrile, methanol, N, N-dimethylformamide and the like.

Any tertiary amine can be employed in preparing the compounds (IV), such as for example, trialkylamines illustrated by trimethylamine, triethylamine, tripropylamine, tributylamine, trihexylamine, trioctylamine and the like; substituted amines such as N-methyl morpholine, N-ethyl morpholine, N-methyl piperidine and the like. The amount of tertiary amine required to be present during the reaction is from about 1 mole eqivalent to about 10 mole equivalent and preferably is from about 1 mole equivalent to about 3 mole equivalent.

Although the process for preparing compounds of the invention (IV) can be carried out under a broad range of temperature conditions, i.e., from about −10°C. to about 100°C., it is preferred to carry out the reaction at room temperature (circa 25°C.).

Depending upon the temperature employed, the reaction is generally complete in from one-quarter of an hour to about 48 hours. When carried out at room temperature, the reaction is generally complete in about two hours. Completion of the reaction can be determined by conventional methods such as by thin layer chromatographic analysis of an aliquot of the reaction mixture which will show the presence of the desired product and disappearance of reactants (II) and (III).

Upon completion of the reaction, the desired compounds (IV) are readily separated from the reaction mixture by conventional techniques such as by solvent extraction and cyrstallization methods, counter-current extraction, chromatographic separation and like methods.

The mixed anhydrides of formula (II) employed as reactants in the above described process are for the most part well known compounds as is their preparation. Anhydrides of formula (II) are prepared by bringing together equimolar proportions of i-butylchloroformate and the corresponding N,N-dialkyl-α-amino acid of formula:

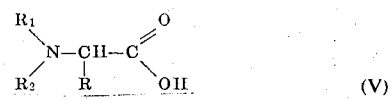

(V)

wherein R is as before defined, $R_1$ and $R_2$ are each alkyl of 1 to 19 carbons; following the procedure of Vaughan and Osato, J. Am. Chem. Soc., 74, 676 (1954).

The N,N-dialkyl-α-amino acids (V) are generally well-known compounds, preparable by a variety of known methods such as by hydrolysis of the corresponding acetonitrile [see Steiger, Org. Syn., Coll. Vol. 3, 66, 84, 88 (1955)]. The N,N-dialkyl-α-aminoacetonitriles are prepared, for example, by the well-known Strecker synthesis, see Allen et al., Org. Syn., Coll. Vol. 3,275, (1955).

Illustrative of the N,N-dialkyl-α-amino acids (V) are N,N-dimethylglycine, N,N-diethylglycine, N,N-dimethylalanine, N,N-diamethylvaline, N,N-dimethylleucine, 2-dimethylaminooctanoic acid, 2-dimethylaminolauric acid, 2-dimethylaminostearic acid, 2-dimethylaminodecanoic acid and the like.

In a preferred embodiment, the Process A is carried out in a continuous manner starting with the preparation of mixed anhydride (II) by reaction of i-butylchloroformate with the N,N-dialkyl-α-amino acid reactant (V). The thiolincosaminide (III) is then added directly to the crude reaction mixture containing anhydride (II), to form the compounds (IV) of the invention.

PROCESS B

Those compounds (I) of the invention wherein A, $R_1$ and $R_2$ are each hydrogen are prepared from a urethane intermediate obtained by modifying the above-described method for preparing the compounds (IV).

The modification comprises replacing the mixed anhydride reactant (II) with a mixed anhydride of formula:

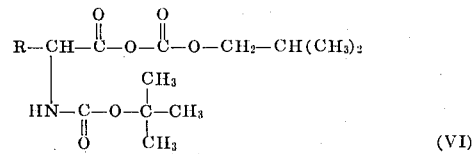

(VI)

wherein R is as before defined. The result of this replacement is the obtaining of a novel intermediate compound of formula:

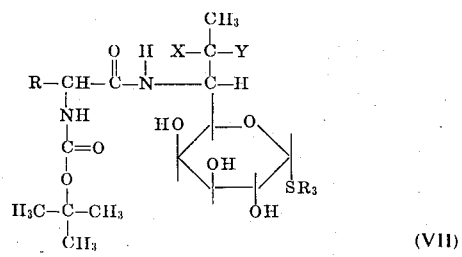

(VII)

wherein R, $R_3$, X and Y are as defined previously.

The urethane compound (VII) is useful as an intermediate for preparing compounds (VIII) and is readily converted to the desired compounds (VIII) of the invention wherein A, $R_1$ and $R_2$ are specifically hydrogen, by dissolution in a strong acid at a temperature of from about −10°C. to about 100°C. Upon dissolution there occurs an elimination reaction according to the scheme:

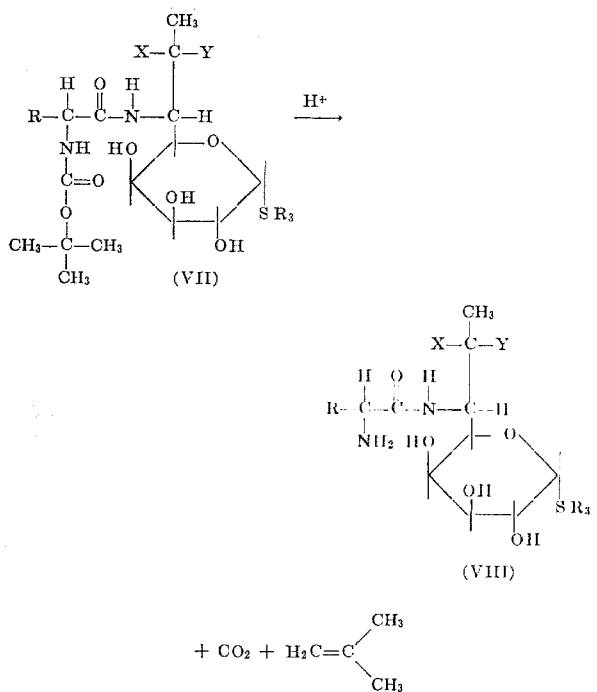

wherein R, $R_3$, X and Y are as previously defined. The compounds (VIII) so obtained are compounds within the scope of formula (I) and represent compounds of the invention (I) wherein A, $R_1$ and $R_2$ are specifically hydrogen.

Illustrative of strong acids which are used in the above elimination reaction are trifluoroacetic acid, hydrochloric or hydrobromic acid in acetic acid, anhydrous hydrochloric acid in ether and like acids. Preferred are solutions of trifluoroacetic acid.

The elimination of the N-t-butoxy group in the above reaction scheme occurs within 2 minutes to 48 hours depending upon the temperature employed in carrying out the reaction, and the particular strong acid used. Completion of the reaction can be visually observed by cessation of the evolution of carbon dioxide by-product.

Upon completion of reaction, the desired compounds (VIII) are separated from the acid reaction mixture by conventional methods of crystallization, filtration, solvent partition, chromatographic separation and like methods.

Anhydride reactants of formula (VI) are prepared by reacting i-butylchloroformate with an appropriate N-(t-butoxycarbonyl)-α-amino acid following the procedure of Vaughan and Osato, J. Am. Chem. Soc., 74, 676 (1954). The N-(t-butoxycarbonyl)-α-amino acids are obtained by reacting t-butylazidoformate with an appropriate α-amino acid, following the procedure for example of Schwyzer et al. Helv. Chim. Acta. 42, 2622 (1959). Appropriate α-amino acids are well known, as illustrated by glycine, α-aminopropionic acid, α-amino-n-butyric acid, α-aminovaleric acid, α-aminoisovaleric acid, α-aminocaproic acid, α-aminoisocaproic acid, α-amino-β-methylvaleric acid, α-aminooctanoic acid, α-aminooenanthic acid, α-aminocaprylic acid, α-aminopelargonic acid, α-aminocapric acid, α-aminolauric acid, α-aminomyristic acid, α-aminostearic acid, α-aminoarachidic acid, and like α-amino acids.

PROCESS C

Compounds (I) of the invention wherein A and one of $R_1$ and $R_2$ is specifically hydrogen while the other is alkyl of 1 to 20 carbon atoms, i.e., a compound of formula (XI), are prepared by reaction of an appropriate alkylamine (X) with an appropriate N-α-halo-acylthiolincosaminide (IX). The reaction is illustrated schematically by the formula:

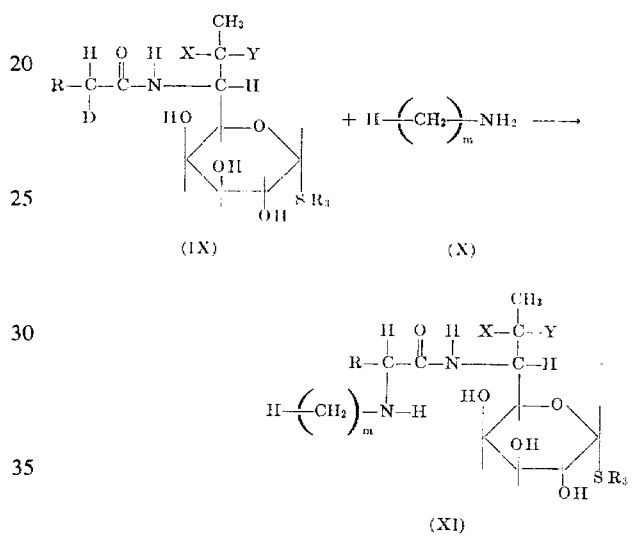

wherein R, $R_3$, X and Y are as previously defined; m is an integer of from 1 to 20; the number of carbon atoms in R plus the value of m does not exceed 20; D is chlorine, bromine, or iodine.

The above illustrated process is carried out by bringing together reactant (IX) with a 1 to 20 molar excess of alkylamine reactant (X) in the presence of a base compound and an inert organic solvent. Although the process proceeds satisfactorily over a broad range of temperatures, i.e., from about −20°C. to about 150°C., it is preferably carried out within a temperature range of from about 25°C. to about 100°C.

Illustrative of inert organic solvents employed in the preparation of compounds (XI) of the invention are pyridine, tetramethylurea, dimethylformamide, dimethylsulfoxide, N-methylpyrrolidone and the like. The requirement for presence of a base compound in the reaction mixture is satisfied when the solvent employed is a base such as pyridine. Otherwise, any inert base such as one of the tertiary amines listed under Process A herein can be employed. The amount of base compound necessary in the reaction mixture is about one mole per mole of amine.

The above reaction is complete within about 1 hour to about 30 days and completion can be ascertained by monitoring the reaction mixture with thin-layer chromatographic techniques or by gas-liquid chromatography. In general, reaction is complete in about 5 minutes to 24 hours when carried out at a temperature of circa 100°C. and within 1 hour to 30 days when carried out at room temperature, depending on the nature of R, $R_1$ and $R_2$.

Upon completion of the reaction, the desired compounds (XI) are conveniently separated from the reaction mixture by conventional techniques such as by crystallization and filtration, counter-current distribution, and chromatographic separation.

Alkylamines (X) are well known compounds as is their preparation (see Rodd's Chemistry of Carbon Compounds, 2nd Ed., Vol. 1, Part B, American Elsevier Publishing Company, N.Y., N.Y., pps. 111–121). Illustrative of alkylamines (X) are methylamine, ethylamine, isopropylamine, n-butylamine, isoamylamine, n-hexylamine, n-heptylamine, n-octylamine, n-nonylamine, isodecylamine, n-dodecylamine, n-hexyldecylamine, eicosylamine and the like.

Alkyl N-($\alpha$-haloacyl)-thiolincosaminide (IX) reactants are novel compounds useful in preparing compounds of the formula (XI) as described herein. The intermediate compounds (IX) are prepared by acylation of the corresponding alkylthiolincosaminide (III) with 1.) an $\alpha$-halo-acid halide (XII) or 2.) a mixed anhydride (XIII) or preferably with 3.) an $\alpha$-halo acid anhydride (XIV). The acylation is illustrated by the schematic formula:

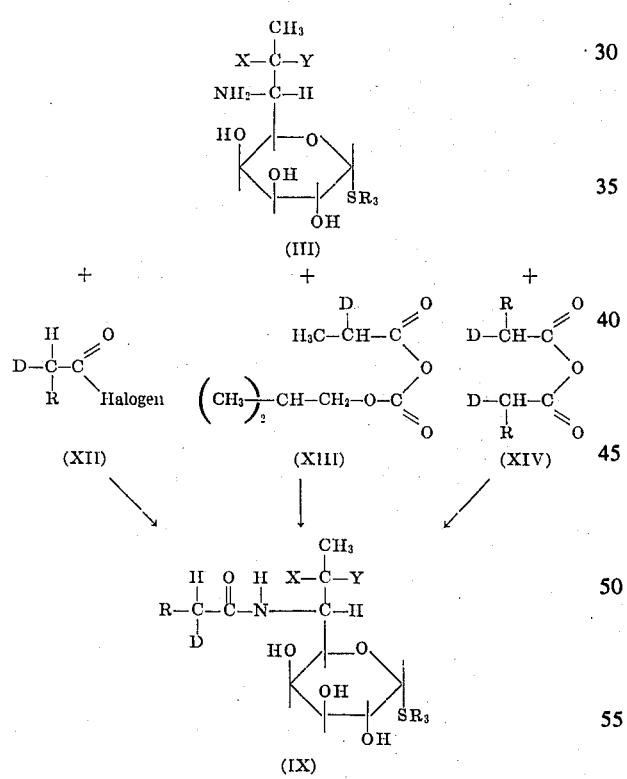

wherein R, $R_3$, X, Y, and D are as previously defined.

The acylation is carried out by admixing substantially equimolar proportions of the reactants (III) and (XII) or (XIII) or (XIV) in an inert organic solvent such as pyridine, dimethylformamide, dimethylsulfoxide, tetramethylurea, N-methylpyrrolidone and the like. If the inert solvent selected for use is not a base, a basic compound such as a tertiary amine must also be present in the reaction mixture in a mole proportion of about 1 to 2. Any tertiary amine, such as those listed under Process A herein are used as the base compound when required in preparing the intermediate compounds (IX) according to Process C.

The acylation is carried out at a temperature of from about room temperature to about 150°C. When carried out at room temperature, acylation is complete in about 1 to about 48 hours. When the reaction mixture is heated to about 150°C., reaction is complete in from 5 minutes to about 24 hours. Completion of the reaction can be observed by thin-layer chromatography or gasliquid chromatography.

Upon completion of the reaction, the desired intermediate compounds (IX) are readily separated from the reaction mixture by conventional techniques such as by crystallization and filtration, chromatographic separation and like methods.

The $\alpha$-halo-acid halides (XII) employed in preparing N-$\alpha$-halo-acyl-thiolincosaminides of formula (IX) are generally well known and are prepared by the method of B. Helfrich and W. Schaefer, Org. Syn. Coll. Vol. I, p. 147. Illustrative of the $\alpha$-halo-acid halides are chloroacetyl chloride, bromoacetyl bromide, chloroacetyl fluoride, $\alpha$-chlorobutyryl chloride, $\alpha$-chlorohexanoyl chloride, $\alpha$-chlorooctanoyl chloride, $\alpha$-chlorodecanoyl chloride, $\alpha$-chlorolauroyl chloride, $\alpha$-chloropalmitoyl chloride, $\alpha$-chlorostearoyl chloride and the like.

The preferred $\alpha$-halo-acid anhydride reactants (XIV) are also generally well known and are prepared, for example, by the method of Egerton et al., J. Chem. Soc., 1860 (1954) or the method of Adkins et al., J. Am. Chem. Soc., 71, 2242 (1949). Representative of $\alpha$-halo-acid anhydrides are chloroacetic anhydride, $\alpha$-chlorobutyric anhydride, $\alpha$-chlorohexanoic anhydride, $\alpha$-chlorooctanoic anhydride, $\alpha$-chlorodecanoic anhydride, $\alpha$-chlorolauric anhydride, $\alpha$-chloromyristic anhydride, and $\alpha$-chloropalmitic anhydride.

The mixed anhydride reactants (XIII) are conveniently prepared by the reaction of i-butyl chloroformate with an appropriate $\alpha$-halo acid of formula:

wherein D and R are as before defined. The reaction is well known; see, for example, Vaughan and Osato, J. Am. Chem. Soc., 74, 676 (1954).

$\alpha$-Halo acids of the formula (XV) are well known as illustrated by chloroacetic acid, 2-bromopropionic acid, 2-iodopropionic acid, 2-chlorobutyric acid, 2-bromovaleric acid, 2-bromocaproic acid, 2-chlorocaprylic acid, 2-chlorolauric acid, 2-chloropalmitic acid, 2-bromopalmitic acid, 2-chlorostearic acid, 2-bromoeicosanoic acid, 2-bromodocosoic acid, and the like; all of which are prepared by halogenation of the corresponding carboxylic acid, using the well-known Hell-Volhard-Zelinsky reaction method.

In a preferred embodiment of the Process C wherein the acylation is carried out with the mixed anhydride reactant (XIII), the process is carried out in a continuous manner beginning with the preparation of anhydride reactant (XIII). Thus, i-butylchloroformate is reacted with an α-halo acid (XV) and the thiolincosaminide (III) is added to the resulting reaction mixture without separating by-products, solvent, etc., to obtain the intermediate compounds (IX) which are immediately reacted with strong acid, without first separating of compounds (IX) from the reaction mixture. The desired compounds (XI) are then conveniently separated from the final reaction mixture.

PROCESS D

The general method of Process C described above for preparing compounds (XI) is modified to provide an alternate method of preparing compounds (I) of the invention wherein A is hydrogen and $R_1$ and $R_2$ are each specifically alkyl of 1 to 19 carbon atoms, inclusive, i.e., a compound (IV) as prepared by Process A, supra. Such modification comprises substituting an appropriate dialkylamine of formula

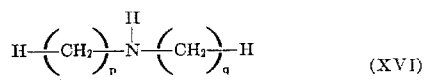

(XVI)

wherein p and q are each integers of from 1 to 19; for the alkylamine (X) reactant as used in preparing compounds (XI) by Process C, supra.

Dialkylamines of formula (XVI) are well known compounds as is their preparation (Rodd's, supra). Illustrative of dialkylamines (XVI) are dimethylamine, diethylamine, n-propyl-n-butylamine, dihexylamine, methyloctylamine, didecylamine, n-decylisoamylamine, methylnonadecylamine, and the like.

Thiolincosaminide compounds (III) employed as starting compounds in Processes A through D to prepare the compounds (I) of the invention are for the most part well known. For example, the preparation of compounds (III) wherein X is hydrogen and Y is chlorine, bromine, or iodine, is taught in U.S. Pat. No. 3,502,648. Those compounds (III) wherein X is hydroxyl and Y is hydrogen are prepared as disclosed in U.S. Pat. No. 3,306,892. To prepare compounds (III) wherein X and Y are both hydrogen, the corresponding N-acylamide (see U.S. Pat. No. 3,435,025) is hydrazinolysed following the procedure of U.S. Pat. No. 3,179,565.

The starting compounds (III) wherein X is hydrogen and Y is alkylthio or monohydroxy substituted alkylthio, are obtained by heating an alkyl N-acyl-6,7-aziridino-6-diamino-7-deoxy-α-thiolincosaminide of formula:

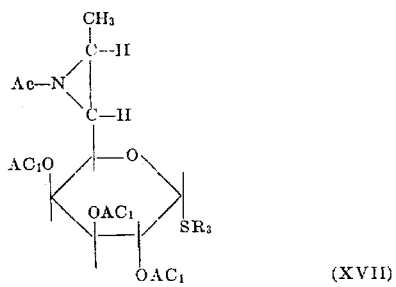

(XVII)

wherein $R_3$ is as defined previously, Ac and $AC_1$ are each carboxyacyl, in the presence of an equimolar proportion of a sulfide of formula:

$$R_4—S—R_4 \quad (XVIII)$$

wherein $R_4$ is an alkyl radical or monohydroxysubstituted alkyl of 1 to 18 carbon atoms, inclusive. The reactants (XVII) and (XVIII) are heated in the presence of glacial acetic acid or other anhydrous loweralkanoic acid, or anhydrous benzoic acid or other arenoic acid of not more than 12 carbon atoms. Opening of the aziridine ring is thus effected yielding an alkyl N-acylated-7-deoxy-7-(s)-(alkylthio)-α-thiolincosaminide of the formula:

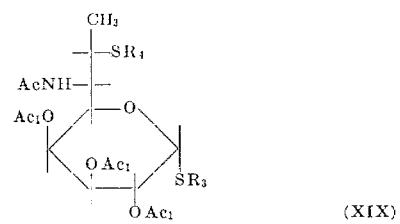

(XIX)

wherein AC, $AC_1$, $R_3$ and $R_4$ are as previously defined. The acyl groups are then removed by hydrazinolysis (method of U.S. Pat. No. 3,179,565) to yield the corresponding alkyl 7-deoxy-7-(S)-(alkylthio)-α-thiolincosaminide of formula:

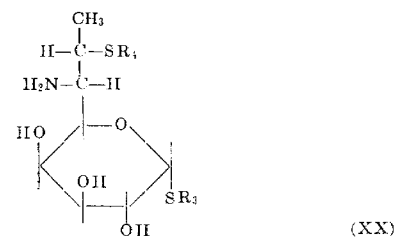

(XX)

wherein $R_3$ and $R_4$ are as previously defined. The compound (XX) is a compound within the formula (III) and more specifically is a starting compound (III) wherein Y is thioalkyl or monohydroxy-substituted thioalkyl.

The starting alkyl N-acyl-6,7-aziridino-6-deamino-7-deoxy-α-thiolincosaminides (XVII) are generally well known and are prepared by acylating the corresponding compounds of formula:

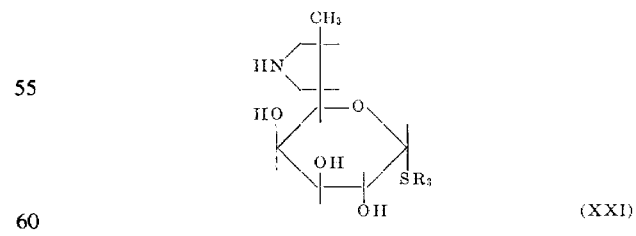

(XXI)

wherein $R_3$ is as previously defined, with a carboxacyl acylating agent, such as, acetic anhydride or other lower alkanoic acid anhydride or benzoyl chloride or like carboxacyl halide, in a manner already known in the art. The compounds (XXI) are well known, see for example, U.S. Pat. No. 3,544,551.

The sulfide compounds (XVIII) are similarly well known and are illustrated by methylsulfide, ethylsulfide, propylsulfide, isobutylsulfide, pentylsulfide, hexylsulfide, heptylsulfide, octylsulfide, nonylsulfide, decylsulfide, tert. dodecylsulfide, hexadecylsulfide, octadecylsulfide and the like.

The acid addition salts of the compounds of formula (I) are useful for the same purposes as the free base compounds. In addition, the salts can be used to upgrade the free base compounds (I) by the same procedures disclosed in U.S. Pat. No. 3,655,885 for upgrading lincomycins. The acid addition salts of the compounds (I) are readily prepared by neutralizing the free base (I) with an appropriate acid to below about pH 7.0, preferably to a pH of between about 2.0 – 6.0. The technique is well known in the art. Appropriate acids include hydrochloric, sulfuric and any of those acids set forth in U.S. Pat. No. 3,549,615 (Cols. 7–8).

The following preparations and examples describe the manner and process of making and using the invention and set forth the best mode contemplated by the inventor of carrying out the invention but are not to be construed as limiting.

The agar diffusion biounit assay (hereinafter referred to as ADB assay) was carried out where indicated by preparing stock solutions of the antibiotic compound at a concentration of 1000 μg./ml. in water or 20 percent dimethylformamide in water. Three two-fold dilutions (1:2, 1:4 and 1:8) were then made from the stock solution, using 0.1M phosphate buffer, pH 7.0. A 12.7 mm paper disk is then treated with 0.08 ml. of the various diluted solutions and the disk is deposited on an agar tray seeded with a test microorganism. The numerical value reported for the assay represents the dilution necessary to give a 20 mm. zone of inhibition around the disk.

Preparation 1 N-(t-Butoxycarbonyl)-2-amino-octanoic acid

To 7.96 grams (0.05 moles) of 2-aminooctanoic acid in a mixture of 250 ml. of tetrahydrofuran, 100 ml. of water and 50 ml. of methanol, there is added 14.3 grams (0.1 moles) of t-butylazidoformate. The resulting reaction mixture is stirred and maintained at a temperature of between 45°C. – 50°C. for about two hours. During this period, the pH of the reaction mixture is maintained at between 9 – 10.5 by the slow addition of 0.4N sodium hydroxide. At the end of the raction period, solvent is removed from the reaction mixture by distillation and the residual oil shaken with 500 ml. of 2N acetic acid. The acid mixture is then extracted with 500 ml. of ether, the ether phase separated and evaporated to obtain a residual oil which crystallizes upon standing to give 9.0 grams (69% of theory) of N-(t-butoxycarbonyl)-2-aminooctanoic acid.

Similarly, repeating the above procedure but replacing the 2-aminooctanoic acid as used therein with 2-aminopropionic acid, 2-aminovaleric acid, 2-aminodecanoic acid, 2-aminoisocaproic acid, 2-aminolauric acid and 2-aminostearic acid, respectively, there is obtained N-(t-butoxycarbonyl)-2-aminopropionic acid, N-(t-butoxycarbonyl)-2-aminovaleric acid, N-(t-butoxycarbonyl)-2-aminodecanoic acid, N-(butoxycarbonyl)-2-aminoisocaproic acid, N-(t-butoxycarbonyl)-2-aminolauric acid, and N-(t-butoxycarbonyl)-2-aminostearic acid.

Preparation 2 Methyl 7-deoxy-7(S)-(methylthio)-α-thiolincosaminide

Part A Methyl N-acetyl-2,3,4-tri-O-acetyl-7-deoxy-7(S)-(methylthio)-α-thiolincosaminide A mixture of 5.0 grams (1 mol. equiv.) of methyl N-acetyl-2,3,4-tri-O-acetyl-6(R), 7(R)-aziridino-6-deamino-7-deoxy-α-thiolincosaminide, 50 ml. of methyl sulfide, and 5.25 grams (7 mol. equivs.) of glacial acetic acid is heated in a Pyrex sealed tube for 20 hours in a steam-bath. Volatile materials are removed from the slightly pink reaction solution by distillation at 100°C., the residue is dissolved in methylene chloride and stirred with an excess of saturated aqueous sodium bicarbonate. Washing of the organic layer with water, drying over anhydrous sodium sulfate, and removal of the solvent on a rotating evaporator at 40°/7 mm. gives a slightly pink solid (5.92 grams). Countercurrent distribution of this solid in the system 1 ethanol: 1 water: 1 ethylacetate: 2 cyclohexane gives methyl N-acetyl-2,3,4-tri-O-acetyl-7-deoxy-7(S)-(methylthio)-α-thiolincosaminide at a K value of 1.21. as colorless rods from ethyl acetate-Skellysolve B having the M. P. 225°– 226°C.

Part B: Methyl 7-deoxy-7(S)-(methylthio)-α-thiolincosaminide

A mixture of 8.05 grams methyl N-acetyl-2,3,4-tri-O-acetyl-7-deoxy-7(S)-(methylthio)-α-thiolincosaminide (Part A) and 100 ml. of hydrazine hydrate is stirred magnetically and heated under gentle reflux in an oil bath at 160°C. for 22 hours. Removal of the volatile material from the colorless solution by distillation over an oil bath at 110°C. /7 mm. gives methyl 7-deoxy-7(S)-(methylthio)-α-thiolincosaminide as a colorless solid which crystallizes from methanol in colorless needles, M. P. 174°–175°C.

Preparation 3 Methyl 7-(S)-(2-hydroxyethylthio)-7-deoxy-α-thiolincosaminide

Part A: Methyl N-acetyl-2,3,4-tri-O-acetyl-7-deoxy-7(S)-(2-hydroxyethylthio)-α-thiolincosaminide Following the procedure of Preparation 2, Part A, but replacing the methylsulfide as used therein, with an equal molar proportion of 2-hydroxyethylmethyl-sulfide and heating on a steam bath at 100° for 5 hours, there is obtained methyl N-acetyl-2,3,4-tri-O-acetyl-7-deoxy-7(S)-(2-hydroxyethylthio)-α-thiolincosaminide (K = 0.97, 1 ethanol:1 water: 1 ethyl acetate: 0.5 cyclohexane) as colorless needles from ethyl acetate-Skellysolve B having M. P. 226°–228°C.

Part B: Methyl 7(S)-(2-hydroxyethylthio)-7-deoxy-α-thiolincosaminide

Following the procedure of Preparation 2, Part B, but replacing the methyl N-acetyl-2,3,4-tri-O-acetyl-7-deoxy-7(S)-(methylthio)-α-thiolincosaminide as used therein with an equal molar proportion of methyl N-acetyl-2,3,4-tri-O-acetyl-7-deoxy-7(S)-(2-hydroxy-ethylthio)-α-thiolincosaminide (from Part A of Preparation 3) there is obtained methyl-7(S)-(2-hydroxyethylthio)-α-thiolincosaminide as colorless platelets from acetonitrile-ethanol, having the M. P. 175°–176°C.

EXAMPLE 1

Methyl (chloroacetyl)-thiolincosaminide

To 50.6 grams (0.2 moles) of methyl thiolincosaminide in 3700 ml. of warm (circa 50°C.) dimethylformamide there is added with stirring 34 grams (0.2 moles) of chloroacetic anhydride in 150 ml. of dimethylformamide and 37.2 grams of tri-n-butylamine. The mixture is allowed to stand for about 1 ½ hours at ambient temperature and then solvent is removed under reduced pressure. The residue is partitioned between 250 ml. of chloroform and 350 ml. of a water-acetone mixture (5:2 parts by volume). The aqueous phase is evaporated to dryness under reduced pressure and the residue recrystallized from 250 ml. of 95% ethanol. Upon separation of the crystals by filtration, there is obtained 20.78 grams of methyl N-(chloroacetyl)-thiolincosaminide in the form of white crystals, M. P. 106°–107°C. An additional 8.85 grams (total 29.63 grams; 45 percent of theory) is obtained by adding ether to the filtrate and separating the precipitated crystals.

EXAMPLE 2

Preparation of Methyl N-(2-aminoisocaproyl)-7(S)-chloro-7-deoxythiolincosaminide To a cooled (circa −15°C.) mixture of 2.3 grams (0.009 moles) of N-(t-butoxycarbonyl)-2-aminoisocaproic acid, (prepared according to Preparation 1, supra.), 50 ml. of acetone and 3.4 ml. of triethylamine there is added 1.55 ml. (1.612 grams; 1.18 moles) of isobutyl chloroformate in 20 ml. of acetone. The resulting mixture is stirred for about three minutes while maintaining the temperature of the reaction mixture, circa −15°C. At the end of this period, 2.71 grams (0.01 moles) of methyl 7(S)-chloro-7-deoxythiolincosaminide in 100 ml. of dimethylformamide is added to the reaction mixture and the resulting reaction mixture allowed to warm to room temperature and stand for about 24 hours. The mixture is then distilled under vacuum at a temperature of about 50°C. to remove solvents. The residue is dissolved in 75 ml. of chloroform and the solution is extracted twice with 80-ml. portions of water. The chloroform phase is then evaporated to dryness to obtain methyl N-[2-(t-butoxycarbonylamino)isocaproyl]-7(S)-chloro-7-deoxythiolincosaminide in the form of viscous semisolid. The latter compound is dissolved in a mixture of 20 ml. of trifluoroacetic acid and 2 ml. of water. The resulting reaction mixture is allowed to stand for about 30 minutes at room temperature and is thereafter evaporated under reduced pressure to dryness. The residue is dissolved in 100 ml. of water and the resulting solution clarified with charcoal. The pH of the clarified solution is adjusted to about 8.0 by the addition of concentrated ammonium hydroxide. A precipitate appears, which is removed by filtration and dried to obtain 1.20 grams of methyl N-(2-aminoisocaproyl)-7(S)-chloro-7-deoxythiolincosaminide in the form of white crystals, M. P. 153°–155°C.

Analysis: Calcd. for $C_{15}H_{29}ClN_2O_5S$ (Percent):
N, 7.28; S, 8.33; M.Wt. 384.92
Found (Percent): N, 6.77; S, 8.18;
M.Wt. (mass spec. M$^+$)384.

Antibiological activity:

| Organism | Minimum Inhibitory Conc. (mcg./ml.) |
| --- | --- |
| S. aureus | 3.2 |
| S. hemolyticus | 0.8 |
| E. coli | >200 |
| K. pneumonia | >200 |
| B. subtilis | 6.4 |

An additional 1.19 grams of methyl N-(2-aminoisocaproyl)-7(S)-chloro-7-deoxythiolincosaminide is obtained by concentration of filtrate from the last filtration made above; total yield 2.39 grams (67 percent of theory).

Similarly, repeating the above procedure but replacing the methyl 7(S)-chloro-7-deoxy-thiolincosaminide as used therein with an equal molar proportion of ethyl 7(S)-chloro-7-deoxythiolincosaminide there is obtained ethyl N-(2-aminoisocaparoyl)-7(S)-chloro-7-deoxythiolincosaminide.

EXAMPLE 3

Preparation of Methyl N-(2-aminooctanoyl)-7(S)-chloro-7-deoxythiolincosaminide

To a cooled of (circa −15°C.) mixture of 2.59 grams (0.01 mole) of N-(t-butoxycarbonyl)-2-aminooctanoic acid (Preparation 1, supra), 100 ml. of acetone and 1.45 ml. of triethylamine there is added 1.55 ml. (1.612 grams; 1.18 moles) of isobutylchloroformate. The resulting mixture is stirred for about 3 minutes and then added to a solution of 2.71 grams (0.01 mole) of methyl 7(S)-chloro-7-deoxythiolincosaminide in 70 ml. of water with 100 ml. of acetone. The resulting reaction mixture is allowed to stand at room temperature for about 3 hours and is then evaporated under vacuum to obtain methyl N-[2-(t-butoxycarbonylamino)-octanoyl]-7(S)-chloro-7-deoxythiolincosaminide in the form of a white solid. The latter compound is then dissolved in a mixture of 35 ml. of trifluoroacetic acid and 6 ml. of water. After standing about 30 minutes at room temperature, the above mixture is evaporated to dryness and the residue dissolved in 400 ml. of a hot (circa 50°C.) acetone-water mixture (3:1 parts by volume). The pH of the resulting solution is adjusted to about 9.0, whereupon there is obtained a small quantity of precipitate which is removed by filtration. On cooling the filtrate, there is obtained a crystalline precipitate which is removed by filtration and dried to give 0.2 grams of methyl N-(2-aminooctanoyl)-7(S)-chloro-7-deoxythiolincosaminide in the form of white crystals, M. P. 190°–191°C.

Analysis: Calcd. for $C_{17}H_{33}ClN_2O_5S$ (Percent):
N, 6.78; S, 7.75; M.Wt. 412.97
Found (Percent): N, 6.64; S, 7.17;
M.Wt. (Mass Spec., M$^+$) 412.

Antibiological activity:

| Organism | Minimum Inhibitory Conc. (mcq./ml.) |
| --- | --- |
| S. aureus | 0.8 |

-Continued

Analysis: Calcd. for $C_{17}H_{33}ClN_2O_5S$ (Percent):
N, 6.78; S, 7.75; M.Wt. 412.97
Found (Percent): N, 6.64; S, 7.17;
M.Wt. (Mass Spec., M+) 412.

Antibiological activity:

| Organism | Minimum Inhibitory Conc. (mcq./ml.) |
|---|---|
| S. hemolyticus | <0.1 |
| E. coli | 200 |
| K. pneumonia | 100 |
| B. subtilis | 1.6 |

Similarly, repeating the above procedure, but replacing the methyl 7(S)-chloro-7-deoxythiolincosaminide as used therein with an equal molar proportion of methyl 7(S)-methylthio-7-deoxy-α-thiolincosaminide (prepared according to Preparation 2, supra) and with an equal molar proportion of methyl 7(S)-(2-hydroxyethylthio)-7-deoxy-α-thiolincosaminide, (prepared according to Preparation 3, supra) respectively, there is obtained methyl N-(2-aminooctanoyl)-7(S)-methylthio-7-deoxy-α-thiolincosaminide and methyl N-(2-aminooctanoyl)-7(S)-(2-hydroxyethylthio)-7-deoxy-α-thiolincosaminide, respectively.

EXAMPLE 4

Preparation of Methyl N-(2-aminodecanoyl)-7(S)-chloro-7-deoxythiolincosaminide free base and hydrochloride Following the procedure of Example 2, supra, but replacing the 2.3 grams of N-(t-butoxycarbonyl)-2-aminoisocaproic acid as used therein with 6.7 grams (0.023 moles) of N-(t-butoxycarbonyl)-2-aminodecanoic acid (prepared according to Preparation 1, supra), and increasing the proportion of methyl 7(S)-chloro-7-deoxy-thiolincosaminide from 2.3 grams as used therein to 8.515 grams (0.031 moles), there is obtained methyl N-[2-(t-butoxycarbonylamino)-decanoyl]-7(S)-chloro-7-deoxythiolincosaminide in the form of pale yellow solid. The latter compound upon dissolution in the trifluoracetic acid solution and subsequent separation steps yields methyl N-(2-aminodecanoyl)-7(S)-chloro-7-deoxythiolincosaminide free base. The free base is dissolved in chloroform and acidified by bubbling hydrogen chloride gas into the solution. A precipitate occurs, which is separated by filtration and dried to give methyl N-(2-aminodecanoyl)-7(S)-chloro-7-deoxythiolincosaminide hydrochloride in the form of white crystals, M. P. 178°–187°C.

Anal. Calcd. for: $C_{19}H_{37}ClN_2O_5S \cdot HCl$ (percent):
C, 47.79; H, 8.01; N, 5.87; S, 6.72
Found: C, 47.73; H, 7.74; N, 5.54; S, 6.50

Antibiological activity (hydrochloride):

| Organism | ADB Assay |
|---|---|
| B. subtilis | >8.0 |
| S. aureus | >8.0 |
| S. lutea | >8.0 |
| M. avium | >8.0 |
| K. pneumoniae | 1.4 |
| E. coli | <1.0 |
| P. fluorescens | <1.0 |

EXAMPLE 5

Preparation of Methyl N-(2-aminolauryl)-7(S)-chloro-7-deoxythiolincosaminide free base and hydrochloride.

Following the procedure of Example 4, supra, but replacing the 6.7 grams of N-(t-butoxycarbonyl)-2-aminodecanoic acid as used therein with 3.16 grams (0.01 mole) of N-(t-butoxycarbonyl)-2-aminolauric acid (prepared according to Preparation 1, supra) and decreasing the proportion of methyl 7(S)-chloro-7-deoxythiolincosaminide from 8.515 grams as used therein to 2.71 grams (0.01 mole), there is obtained methyl N-[2-t-butoxycarbonylamino)lauroyl]-7(S)-chloro-7-deoxythiolincosaminide in the form of a viscous residue. The latter compound upon dissolution in the trifluoroacetic acid solution step and subsequent separation steps yields a solid which is methyl N-(2-aminolauroyl)-7(S)-chloro-7-deoxythiolincosaminide free base. Upon dissolution in chloroform, acidification with hydrogen chloride gas and separation as in Example 4, supra, there is obtained 1.2 grams of methyl N-(2-aminolauryl)-7(S)-chloro-7-deoxythiolincosaminide hydrochloride in the form of white crystals, M. P. 115°–120°C.

The methyl N-(2-aminolauroyl)-7(S)-chloro-7-deoxythiolincosaminide hydrochloride so obtained is a mixture of the D- and L- isomers. Mass spectral analysis of both isomers show a molecular weight (m/e) of 468 (theory 468.47). The two isomers are separable, when desired, by conventional techniques such as by chromatographic separation or by selective solvent extraction. Both the D- and L- forms show antibacterial activity against S. aureus, ST. faecalis, E. coli, P. vulgaris, K. pneumonia, S. schottmuelleri, Ps. aeruginosa, B. subtilis and like microorganisms. The mixture of D- and L-isomers has a plate antibacterial activity equivalent to 0.01 times that of lincomycin hydrochloride using S. lutea as the test organism.

EXAMPLE 6

Preparation of Methyl N-[(2-dimethylamino)-octanoyl]-7(S)-chloro-7-deoxythiolincosaminide free base and the hydrochloride To a cooled (circa −10°C.) mixture of 135 grams (0.01 mole) isobutyl chloroformate, 10 ml. of acetone and 1.45 ml. of triethylamine is added 1.87 grams (0.01 mole) of 2-dimethylaminooctanoic acid in 200 ml. of tetrahydrofuran. The resulting reaction mixture is stirred for about three minutes while maintaining the temperature of the mixture at circa −10°C. At the end of this period, 2.719 grams (0.01 mole) of methyl 7(S)-chloro-7-deoxythiolincosaminide in a mixture of 100 ml. of acetone and 50 ml. of water is added to the reaction mixture with mixing. The resulting mixture is allowed to stand for about 1 hour at room temperature, and is thereafter distilled under vacuum and at a temperature of about 50°C. to remove solvents. The residue is partitioned between 200 ml. of a 10 percent aqueous solution of acetic acid and 200 ml. of chloroform. The aqueous phase is then separated, and the pH of said phase adjusted to about 9.0 by the addition of ammonium hydroxide. The resulting mixture is extracted with 50 ml. of chloroform and the chloroform extracted phase evaporated to dryness. The residue is methyl N-[(2-dimethylamino)-octanoyl]-7(S)-chloro-7-deoxythiolincosaminide free base. The free base is dissolved in ether and gaseous hydrogen chloride bubbled into the resulting solution to precipitate a crystalline material. The crystals are separated by filtration. Recrystallization from a hot mixture of acetone and water (99.1 parts by volume) gives 400 mg. of methyl N-[(2-dimethylamino)octanoyl]-7(S)-chloro-7-deoxythiolincosaminide hydrochloride in the form of white crystals, M. P. 199°–200°C.

Anal. Calcd. for: $C_{19}H_{37}ClN_2O_5S \cdot HCl$ (percent):
S, 6.71; M. Wt. 477.47
Found (percent): S, 6.53; M. Wt. (Mass spec. M+—HCl) 440.2084

Antibiological activity (hydrochloride):

Plate antibacterial activity equivalent to 0.1 times that of lincomycin hydrochloride using S. *lutea* as the test organism.

EXAMPLE 7

Preparation of Methyl N-[2-(methyloctylamino)-propionyl]-7(S)-chloro-7-deoxythiolincosaminide free base and hydrochloride.

To a cooled (circa —10°C.) mixture of 5.05 grams (0.37 mole) of isobutylchloroformate and 20 ml. of acetone, there is added 5.6 grams (0.037 mole) of 2-bromopropionic acid and 6.2 ml. of triethylamine in 50 ml. of acetone. The resulting mixture is stirred for about four minutes while maintaining the temperature at about —10°C. At the end of this period, there is added 10 grams (0.037 mole) of methyl 7(S)-chloro-7-deoxythiolincosaminide in 300 ml. of dimethylformamide and the resulting mixture is allowed to stand for about thirty minutes at room temperature. The mixture is then filtered. To the filtrate there is added 10 grams of tri-n-butylamine and 10 grams of N,N-octylmethylamine. The resulting mixture is refluxed for about 45 minutes, and the reaction mixture concentrataed to a viscous liquid, which contains methyl N-[(2-methyloctylamino)-propionyl]-7(S)-chloro-7-deoxythiolincosaminide free base. The liquid residue is dissolved in 200 ml. of ether and the solution extracted three times with 500-ml. portions of 10% aqueous sodium carbonate, and then with two 2,000-ml. portions of 0.1N hydrochloric acid. The extracts are combined and adjusted to a pH of about 8.0 with sodium carbonate. The combined extracts are then extracted with 400 ml. of ether, and the latter extract extracted with 2,400 ml. of 0.1M aqueous phosphate-citrate buffer, pH 6.1. The ether phase is then dried over sodium sulfate and made slightly acidic to pH paper by the addition of anhydrous hydrochloric acid. There is then obtained a precipitate. The solvent is removed by warming under reduced pressure to yield 3.7 grams of a brown residue which is crude methyl N-[2-(methyloctylamino)-propionyl]-7(S)-chloro-7-deoxythiolincosaminide hydrochloride. The hydrochloride is purified by dissolving in 100 ml. of chloroform, and decolorizing by the addition of 1.5 grams of silica gel G (Merck and Co., TLC grade). The resulting mixture is diluted with 150 ml. of ether and the diluted mixture extracted with 350 ml. of 0.1M aqueous phosphate-citrate buffer, pH 3. The extracted ether solution is dried over sodium sulfate and made acidic to pH paper by the addition of anyhdrous hydrochloric acid. The acidified solution is evaporated under vacuum to dryness and the residue dissolved in 50 ml. of chloroform. To the latter solution there is added about 200 ml. of ether, whereupon a white solid precipitates. The precipitate is removed by filtration and dried to give 1.7 grams of methyl N-[2-(methyloctylamino)-propionyl]-7(S)-chloro-7-deoxythiolincosaminide hydrochloride in the form of a white solid, M. P. 85°–93°C.

Anal. Calcd. for: $C_{21}H_{41}ClN_2O_5S \cdot HCl$ (percent):
C, 49.89; H, 8.38; N, 5.54; S, 6.34
Found (percent): C, 49.54; H, 8.27; N, 5.47; S, 6.21

Antibiological activity (hydrochloride):

| Organism | ABD Assay |
| --- | --- |
| B. subtilis | 2.6 |
| S. aureus | 4.0 |
| S. lutea | 2.5 |
| M. avium | 1.8 |
| K. pneumoniae | 2.4 |
| P. fluorescens | <1.0 |

EXAMPLE 8

Preparation of Methyl N-[(octylamino)-acetyl]-7(S)-chloro-7-deoxythiolincosaminide free base and hydrochloride To 10 grams (0.037 mole) of methyl 7(S)-chloro-7-deoxythiolincosaminide in 300 ml. of dimethylformamide there is added 6.25 grams (0.037 mole) of chloroacetic anhydride in 20 ml. of dimethylformamide and then 10 ml. of tri-n-butylamine. The mixture is allowed to stand for about 30 minutes at room temperature whereupon there is formed in the reaction mixture the compound methyl N-(chloroacetyl)-7(S)-chloro-7-deoxythiolincosaminide. To the reaction mixture there is then added 50 ml. of n-octylamine and the resulting reaction mixture allowed to stand for about 4 days at a temperature of circa 40°C. At the end of this period, 100 ml. of water is added and the resulting mixture evaporated to dryness under vacuum and at a temperature of about 60°C. The residue is dissolved in 200 ml. of chloroform and the resultant solution extracted three times with 2000-ml. portions of water and once with 200 ml. of water containing 25 ml. of concentrated ammonium hydroxide. The extracted chloroform solution is then evaporated to dryness to give a solid residue which is methyl N-[(octylamino)acetyl]-7(S)-chloro-7-deoxythiolincosaminide free base. The free base is dissolved in chloroform, and the resulting solution acidified by bubbling in gaseous hydrogen chloride. The acidified solution is evaporated to give 6 grams (34 percent of theory) of methyl N-[(octylamino-acetyl]-7-(S)-chloro-7 -deoxythiolincosaminide hydrochloride in the form of white crystals, M. P. 201.0°–201.5°C.

Anal. Calcd. for: $C_{19}H_{37}ClN_2O_5S \cdot HCl$ (percent):
C, 47.79; H, 8.02; N, 5.87; S, 6.71
Found (percent): C, 48.22; H, 8.03; N, 5.51; S, 6.57

Antibiological activity (hydrochloride):

| Organism | ADB Assay |
| --- | --- |
| B. subtilis | 4.4 |
| S. aureus | 2.8 |
| S. lutea | 2.3 |
| M. avium | 3.2 |
| K. pneumoniae | 1.7 |
| P. fluorescens | 72.0 |

Similarly, repeating the above procedure but replacing the n-octylamine as used therein with an equal molar proportion of eicosylamine, there is obtained methyl N-[(eicosylamino)acetyl]-7-deoxythiolincosaminide, and the hydrochloride salt thereof.

EXAMPLE 9

Preparation of Methyl N-[(methylhexylamino)acetyl]-thiolincosaminide free base and hydrochloride.

To a mixture of 10 grams (0.030 mole) of methyl N-(chloroacetyl)-thiolincosaminide (Example 1, supra), and 20 ml. of dimethylformamide, there is added 6 ml. of N,N-hexylmethylamine and 10 ml. of tri-n-propylamine. The resulting reaction mixture is heated for about 30 minutes at 100°C. and then distilled under reduced pressure at a temperature of about 45°C. to remove solvents. The residual oily liquid is partitioned between 200 ml. of chloroform and 200 ml. of 5 percent aqueous sodium carbonate. The chloroform phase is then extracted with 200 ml. of 4N aqueous hydrochloric acid. The aqueous layer extract is then made alkaline (pH circa 10) with sodium carbonate and the resulting mixture extracted twice with 200 ml. portions of chloroform. The combined chloroform extracts are then dried over sodium sulfate and solvent evaporated to give a residue which is methyl N-[(methylhexylamino)-acetyl]-thiolincosaminide free base. The free base is dissolved in chloroform and the resulting solution acidified by the addition of anhydrous hydrogen chloride. The acid mixture is then evaporated under reduced pressure to dryness. The residue is recrystallized from a mixture of 20 ml. of methanol and 450 ml. of acetone to give 6.5 grams (49 percent of theory) of methyl N-[(methylhexylamino)-acetyl]-thiolincosaminide HCl in the form of white crystals, M.P. 105°–113°C.

Anal. Calcd. for: $C_{18}H_{36}ClN_2O_6S \cdot HCl$ (percent):
C, 48.58; H, 8.38; N, 6.29; S, 7.20
Found (percent): C, 48.60; H, 8.70; N, 6.36; S, 7.12

Antibiological activity (hydrochloride):

| Organism | ADB Assay |
|---|---|
| B. subtilis | 2.1 |
| S. aureus | 2.0 |
| S. lutea | 3.2 |
| M. avium | 2.1 |

EXAMPLE 10

Preparation of Methyl N-[(methyloctylamino)-acetyl]-thiolincasaminide free base and hydrochloride.

Following the procedure of Example 9, but replacing the 6 ml. of N, N-hexylmethylamine as used therein with 22 grams (0.15 mole) of N,N-methyloctylamine and increasing the proportion of methyl N-(chloroacetyl)-thiolincosaminide from 10.0 grams as used therein to 11.0 grams (0.033 mole) there is obtained methyl N-[(methyloctylamino)-acetyl]-thiolincosaminide free base which, upon dissolution in chloroform, acidification of the resulting solution with anhydrous hydrogen chloride and evaporation of solvent as in Example 9, gives 9.05 grams (57 percent of theory) of methyl N-[(methyloctyl- amino)-acetyl]-thiolincosaminide.HCl in the form of white crystals, M. P. 147° – 150°C.

Anal. Calcd. for: $C_{20}H_{40}ClN_2O_6S \cdot HCl$ (percent):
C, 50.78; H, 8.74; N, 5.92; S, 6.77
Found (percent): C, 50.98; H, 8.84; N, 6.21; S, 6.80

Antibiological activity (hydrochloride):

| Organism | ADB Assay |
|---|---|
| B. subtilis | 2.1 |
| S. aureus | 1.1 |
| S. lutea | 1.7 |
| M. avium | >1.0 |
| K. pneumoniae | <1.0 |

EXAMPLE 11

Preparation of Methyl N-[(n-decylaminoacetyl]-7(S)-chloro-7-deoxythiolincosaminide free base and hydrochloride.

To a solution of 10 grams (0.037 mole) of methyl 7(-S)-chloro-7-deoxythiolincosaminide in 100 ml. of dimethylformamide there is added 6.2 grams (0.037 mole) of chloroacetic anhydride and 8 ml. of tri-n-butylamine, with stirring. After standing for about 1 hour at room temperature, 30 ml. of n-decylamine is added and the resulting reaction mixture allowed to stand for about fourteen days at room temperature. At the end of this period, the reaction mixture comprises a liquid phase and a solid crystal precipitate. The two phases are separated by filtration and the filtrate diluted with 800 ml. of water. The diluted filtrate is then made alkaline (pH circa 10) by addition of ammonium hydroxide, whereupon a solid material precipitates out of the solution. The mixture is separated by filtration and the solid precipitate extracted with 500 ml. of chloroform. The extract is evaporated to remove solvent and the residue chromatographed on 800 grams of silica gel (Merck 0.05-0.2 mm) packed in methylethylketone, acetone and water (186:52:20 parts by volume). The column is eluted with the same solvent and the first 300 ml. of eluate discarded. Twenty ml. fractions are collected thereafter and fractions No. 42–61 combined. The combined fractions are evaporated to remove solvents. The residue is methyl N-[(n-decylamino)acetyl]-7(S)-chloro-7-deoxythiolincosaminide free base. The residue is dissolved in 200 ml. of chloroform and anhydrous hydrogen chloride is bubbled into the resulting solution until said solution is acidic as shown by wetting a litmus paper. The solution is then evaporated under reduced pressure and the resulting residue crystallized from 20 ml. of methanol upon the addition of 75 ml. of acetonitrile. The crystals are separated by filtration and dried to give 0.95 grams of methyl N-[(n-decylamino)-acetyl]-7(S)-chloro-7-deoxythiolinosaminide.HCl in the form of white crystals, M. P. 216.0° – 216.5°C.

Anal. Calcd. for: C₂₁H₄₁ClN₂O₅S.HCl (percent):
C, 49.89; H, 8.38; N, 5.54; S, 6.34
Found (percent): C, 49.59; H, 8.02; N, 5.08; S, 6.48

Antibiological activity (hydrochloride):

| Organism | ADB Assay |
|---|---|
| B. subtilis | <1.0 |
| S. aureus | >1.0 |
| S. lutea | >1.0 |
| K. pneumoniae | >1.0 |
| E. coli | <1.0 |

Similarly, repeating the above procedure but replacing the n-decylamine as used therein with an equal molar proportion of eicosylamine, there is obtained methyl N-[(eicosylamino)acetyl]-7(S)-chloro-7-deoxythiolincosaminide free base and the hydrochloride salt thereof.

EXAMPLE 12

Preparation of Methyl N-[(butylamino)-acetyl]-7(S)-chloro-7-deoxythiolincosaminide free base and hydrochloride.

Following the procedure of Example 11, supra, but replacing the 30 ml. of n-decylamine as used therein with 100 ml. of n-butylamine, and carrying out the chromatographic step over 1000 grams of silica gel, replacing the methylethylketone, acetone and water solvent with chloroform-methanol (8:2 parts by volume), there is obtained upon evaporation of solvents a white solid which is methyl N-[(butylamino)-acetyl]-7(S)-chloro-7-deoxythiolincosaminide free base. The free base is dissolved in 30 ml. of hot water. The resulting solution is acidified with concentrated hydrochloric acid and upon the addition of 300 ml. acetonitrile there is obtained 1.77 gram of methyl N-[(butylamino)-acetyl]-7(S)-chloro-7-deoxythiolincosaminide hydrochloride in the form of white crystals, M. P. 234°C.

Anal. Calcd. for: C₁₅H₂₉ClN₂O₅S.HCl (percent):
C, 42.76; H, 7.18; N, 6.65; S, 7.61
Found (percent): C, 42.68; H, 7.34; N, 6.94; S, 8.10

Antibiological activity (hydrochloride):

| Organism | ADB Assay |
|---|---|
| B. subtilis | 1.3 |
| S. aureus | <1.0 |
| S. lutea | <1.0 |

EXAMPLE 13

Preparation of Methyl N-[(hexylamino)-acetyl]-7(S)-chloro-7-deoxythiolincosaminide free base and hydrochloride.

Following the procedure of Example 11, supra, but replacing the 30 ml. of n-decylamine as used therein with 50 ml. of n-hexylamine, increasing the proportion of chloroacetic anhydride from 6.2 grams as used therein to 6.25 grams and carrying out the chromatographic step over 1,000 grams of silica gel, replacing the methylethylketone, acetone and water solvent of Example 11 with ethyl acetate-acetone-water (8:5:1 parts by volume), there is obtained methyl N-[(hexylamino)-acetyl]-7(S)-chloro-7-deoxythiolincosaminide free base. Upon dissolving the free base in chloroform and acidification of the solution with hydrogen chloride followed by the evaporation of solvent and subsequent crystallization and separative steps according to the procedure of Example 11., there is obtained 4.5 grams of methyl N-[(hexylamino)-acetyl]-7(S)-chloro-7-deoxythiolincosaminide.HCl in the form of white crystals, M. P. 204°C.

Anal. Calcd. for: C₁₇H₃₃ClN₂O₅S.HCl (percent):
C, 45.43; H, 7.63; N, 6.23; S, 7.13
Found (percent): C, 45.85; H, 7.61; N, 5.98; S, 706

Antibiological activity (hydrochloride):

| Organism | ADB Assay |
|---|---|
| B. subtilis | 5.8 |
| S. aureus | 2.6 |
| S. lutea | 2.0 |

EXAMPLE 14

Following the procedure of Example 1, supra, but replacing the metyl thiolincosaminide as used therein with an equal molar proportion of methyl 7(S)-chloro-7-deoxythiolincosaminide, there is obtained methyl N-(chloroacetyl)-7(S)-chloro-7-deoxythiolincosaminide.

I claim:

1. A compound selected from the group consisting of those of formula:

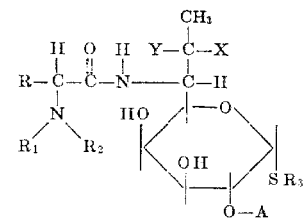

wherein R, R₁ and R₂ are each selected from hydrogen and alkyl of from 1 to 20 carbon atoms, inclusive, provided that the total number of carbon atoms in R, R₁ and R₂ together does not exceed 20; R₃ is alkyl of 1 to 2 carbon atoms, inclusive; X is selected from hydrogen and hydroxy; Y is hydrogen when X is hydroxy and when X is hydrogen, Y is selected from hydrogen, chlorine, bromine, iodine, alkylthio and monohydroxy-substituted alkylthio, said alkylthio in each of instance having from 1 to 18 carbon atoms, inclusive; A is selected from hydrogen and an acyl radical of a hydrocarbon carboxylic acid containing from 2 to 18 carbon atoms, inclusive; and the acid addition salts thereof.

2. A compound according to claim 1 wherein the total number of carbon atoms in R, R₁ and R₂ together is from about 6 to about 16.

3. A compound according to claim 1 wherein Y is akylthio of 1 to 18 carbon atoms, inclusive.

4. A compound according to claim 1 wherein y is monohydroxy-substituted alkylthio of 1 to 18 carbon atoms, inclusive.

5. A compound according to claim 1 wherein A is an acyl radical of a hydrocarbon carboxylic acid containing from 2 to 18 carbon atoms, inclusive.

6. A compound selected from the group consisting of those of formula:

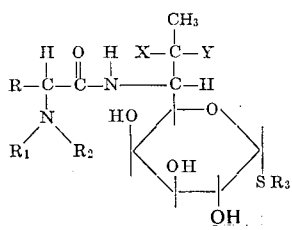

and the acid addition salts thereof,
wherein R, $R_1$ and $R_2$ are each selected from hydrogen and alkyl of 1 to 10 carbon atoms, inclusive, and are such that the total of carbon atoms in R, $R_1$ and $R_2$ together does not exceed 20; $R_3$ is alkyl having 1 to 2 carbon atoms, inclusive; X is selected from hydrogen and hydroxyl; when X is hydroxyl, Y is hydrogen and when X is hydrogen, Y is selected from chlorine, bromine and iodine.

7. The compound according to claim 6 which is methyl N-(2-aminoisocaproyl)-7(S)-chloro-7-deoxy-thiolincosaminide and the acid addition salts thereof.

8. The compound according to claim 6 which is methyl N-(2-aminooctanoyl)-l7(S)-chloro-7-deoxythiolincosaminide and the acid addition salts thereof.

9. The compound according to claim 6 which is methyl N-(2-aminodecanoyl)-7(S)-chloro-7-deoxythiolincosaminide and the acid addition salts thereof.

10. The compound according to claim 6 which is methyl N-(2-aminolauroyl)-7(S)-chloro-7-deoxythiolincosaminide and the acid addition salts thereof.

11. The compound according to claim 6 which is methyl N-[(2-dimethylamino)-octanoyl]-7(S)-chloro-7-deoxythiolincosaminide and the acid addition salts thereof.

12. The compound according to claim 6 which is methyl N-[2-(methyloctylamino)-propionyl]-7(S)-chloro-7-deoxythiolincosaminide and the acid addition salts thereof.

13. The compound according to claim 6 which is methyl N-[(octylamino)-acetyl]-7(S)-chloro-7-deoxy-thiolincosaminide and the acid addition salts thereof.

14. The compound according to claim 6 which is methyl N-[(methylhexylamino)-acetyl]-thiolincosaminide and the acid addition salts thereof.

15. The compound according to claim 6 which is methyl N-[(methyloctylamino)-acetyl]-thiolincosaminide and the acid addition salts thereof.

16. The compound according to claim 6 which is methyl N-[(n-decylamino)-acetyl]-7(S)-chloro-7-deoxythiolincosaminide and the acid addition salts thereof.

17. The compound according to claim 6 which is methyl N-[(butylamino)-acetyl]-7(S)-chloro-7-deoxy-thiolincosaminide and the acid addition salts thereof.

18. The compound according to claim 6 which is methyl N-[(hexylamino)-acetyl]-7(S)-chloro-7 deoxy-thiolincosaminide and the acid addition salts thereof.

19. A compound of the formula:

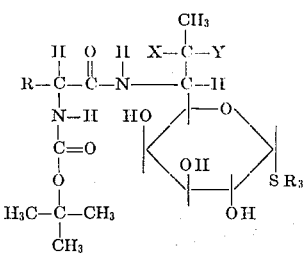

wherein R is selected from hydrogen and alkyl of 1 to 20 carbon atoms, inclusive; $R_3$ is alkyl of 1 to 2 carbon atoms, inclusive; X is selected from hydrogen and hydroxy; Y is hydrogen when X is hydroxyl and when X is hydrogen, Y is selected from hydrogen, chlorine, bromine, iodine, alkylthio and hydroxy-substituted alkylthio, said alkylthio in each instance containing 2 to 18 carbon atoms, inclusive.

20. A compound of the formula:

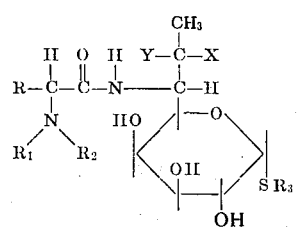

wherein R is selected from hydrogen and alkyl of 1 to 20 carbon atoms, inclusive; $R_3$ is alkyl of 1 to 2 carbon atoms, inclusive; D is selected from chlorine, bromine and iodine; X is selected from hydrogen and hydroxyl; Y is hydrogen when X is hydroxyl and when X is hydrogen, Y is selected from hydrogen, chlorine, bromine, iodine, alkylthio and hydroxy-substituted alkylthio, said alkylthio in each instance containing 2 to 18 carbon atoms, inclusive.

* * * * *

UNITED STATES PATENT OFFICE
CERTIFICATE OF CORRECTION

PATENT NO. : 3,853,843
DATED : December 10, 1974
INVENTOR(S) : Walter Morozowich It is certified that error appears in the above-identified patent and that said Letters Patent are hereby corrected as shown below:

Front page, under ABSTRACT in formula, for "Y-C-X" read -- X-C-Y --. Column 2, line 24, for "dimethlcyclohexanecarboxylic" read -- dimethylcyclohexenecarboxylic --. Column 5, line 3, for "X-C-H" read -- X-C-Y --. Column 11, line 66, for "carboxyacyl" read -- carboxacyl --. Column 13, line 65, for "N-(butoxycarbonyl)" read -- N-(t-butoxycarbonyl) --. Column 16, line 31, for "cooled of (circa" read -- cooled (circa --; line 66, for "(mcq./ml.)" read -- (mcg./ml.) --. Column 17, line 9, for "(mcq./ml.)" read -- (mcg./ml.) --. Column 19, line 26, for "(0.37 mole)" read -- (0.037 mole) --; line 37, for "trin-butylamine" read -- tri-n-butylamine --; line 67, for "anyhdrous" read -- anhydrous --. Column 20, line 68, for "72.0" read -- >2.0 --. Column 23, line 10, for "E. coll" read -- E. coli --. Column 24, line 12, for "S, 706" read -- S, 7.06 --; line 33, claim 1, for "Y-C-X" read -- X-C-Y --. Column 25, line 23, claim 8, for "-17 (S)" read -- -7 (S) --. Column 26, line 33, claim 20, for "Y-C-X" read -- X-C-Y --.

Signed and Sealed this twenty-third Day of September 1975

[SEAL]

Attest:

RUTH C. MASON
Attesting Officer

C. MARSHALL DANN
Commissioner of Patents and Trademarks